April 19, 1932.    J. N. NISSEN    1,854,858
AUTOMATIC FLOW CONTROL AND MEASURING WEIR
Filed April 16, 1929    2 Sheets-Sheet 1
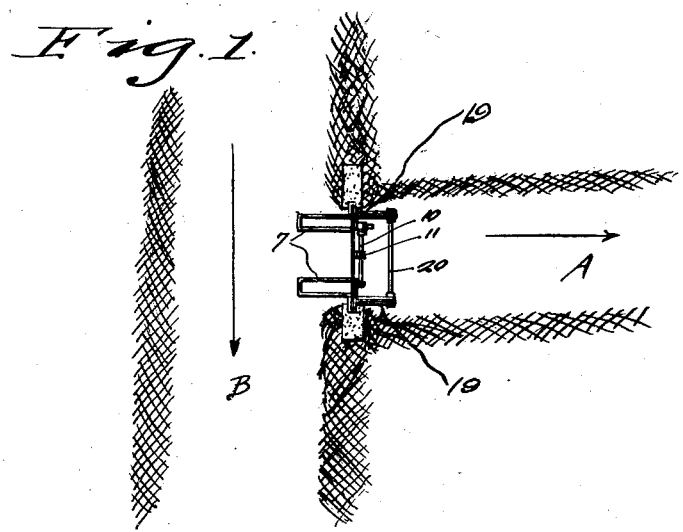
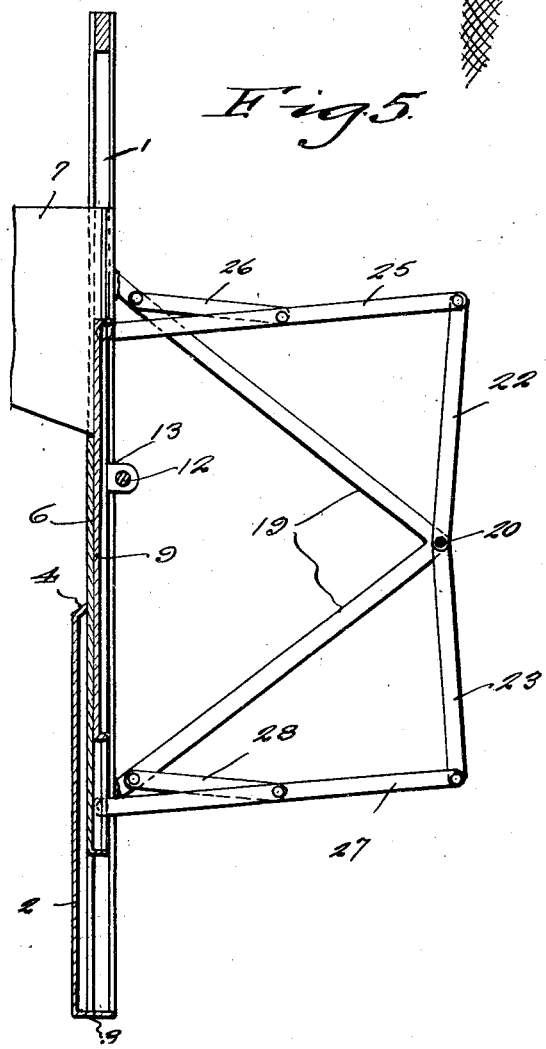
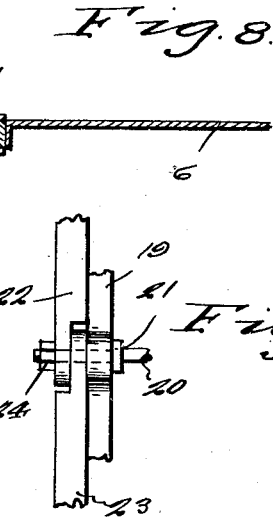
Inventor
J. N. Nissen
By Clarence A. O'Brien
Attorney

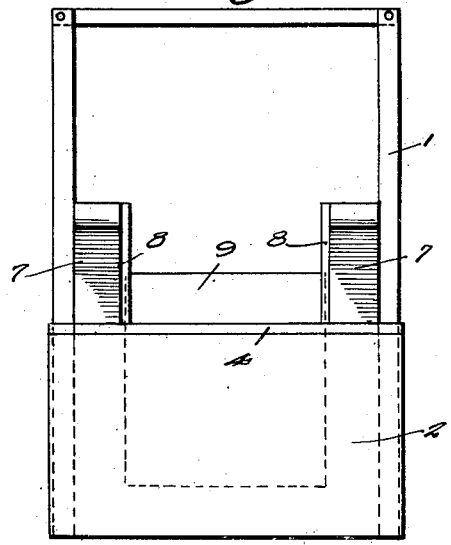
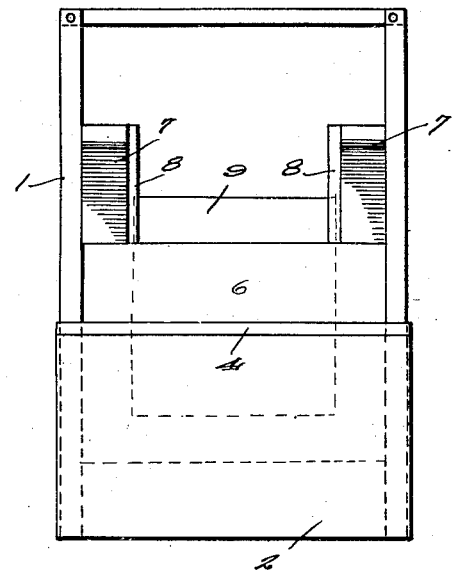
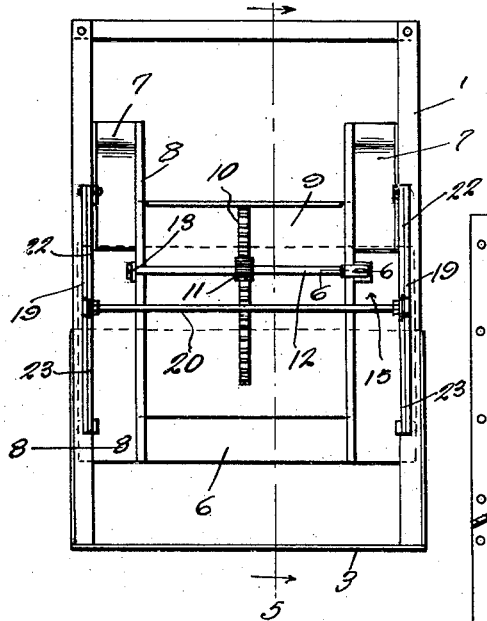
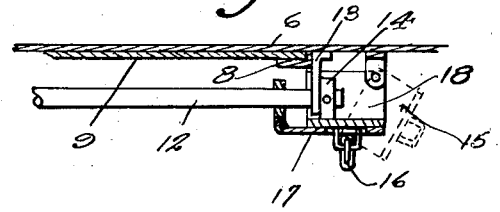
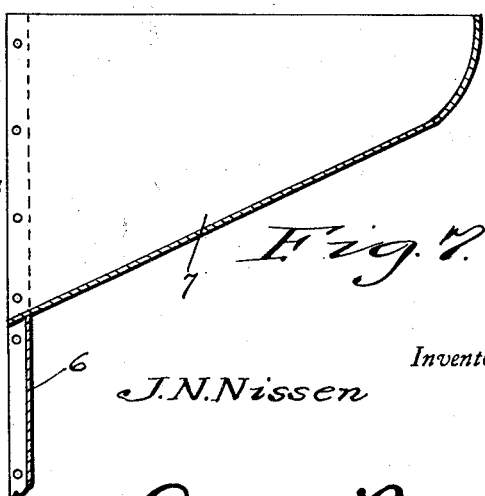
Inventor
J. N. Nissen
By Clarence A. O'Brien
Attorney Patented Apr. 19, 1932

1,854,858

UNITED STATES PATENT OFFICE

JERRY N. NISSEN, OF SEATTLE, WASHINGTON

AUTOMATIC FLOW CONTROL AND MEASURING WEIR

Application filed April 16, 1929. Serial No. 355,615.

The present invention relates to improvements in measuring weirs and has for its principal object to provide a device for automatically regulating the flow of water in a channel, ditch, flume or the like, and for measuring the water discharged through said passage.

One of the important objects is to provide an automatic regulating device for accurately controlling the flow of water in a channel, ditch, flume or the like, which regardless of fluctuation of the amount of water in the main canal may be readily adjusted.

A further object is to provide a device of the above mentioned character wherein the same includes a stationary weir plate, an automatically operable measuring weir plate being arranged for vertical slidable movement adjacent the stationary weir plate, said movable weir plate having associated therewith pontoons or current impact members operatively associated therewith for effecting the raising and lowering of the movable weir.

Still a further object is to provide a structure of the above mentioned character that includes a manually adjustable vertical sliding weir plate that is carried by the automatically operable sliding weir plate and is capable of movement between the pontoons to regulate the flow of water.

Still a further object resides in the provision of a device of the above mentioned character that will at all times, be positive and efficient in its operation, the same further being simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application and wherein, like reference characters designate like parts throughout the views:

Figure 1 is a top plan view showing the device positioned in a main channel for regulating the flow of water into a lateral channel.

Figure 2 is an elevational view looking from the upstream side of the device, showing the automatically movable weir gate, in a partially raised position.

Figure 3 is a similar view showing the manually operable measuring gate slightly raised above the upper edge of the automatically movable measuring weir.

Figure 4 is a view similar to Figure 3, looking from the rear or down stream side.

Figure 5 is a vertical sectional view, taken approximately on the line 5—5 of Figure 4, in the direction of the arrows, the locking means for the manually rotatable shaft not being shown.

Figure 6 is a sectional view, taken approximately on the line 6—6 of Figure 4, for more clearly disclosing the locking means associated with the manually operable shaft, to control the raising and lowering of the innermost weir gate.

Figure 7 is a sectional view, through one of the pontoons and the adjacent portion of the automatically movable weir plate.

Figure 8 is a sectional view, taken approximately on the line 8—8 of Figure 4, and Figure 9 is an edge view showing the manner in which the vertically disposed arms are pivotally connected at their adjacent ends to the apex portions of the V-shaped bracket that extends laterally from the main frame of the device.

In the drawings, wherein for the purpose of illustration is shown the preferred embodiment of my invention, the numeral 1 designates a U-shaped frame that is disposed vertically in an inverted position within the sides of a wooden or concrete flume or box, for disposition within a lateral canal or channel A adjacent the main canal or channel B. The side members of the frame 1 are channel shaped in cross section, as shown to advantage in Figures 5 and 8.

A weir plate 2 is secured in a stationary manner on the upstream side of the bottom portion of the inverted U-shaped frame, the lower edge of the plate being directed inwardly as at 3. The side edges of the weir plate lie flush with the side edges of the frame, and this plate is formed at its upper edge with the inclined face 4. Any appropriate means may be provided for securing the stationary weir plate to the upstream side of the frame 1.

Arranged for slidable movement within the channeled sides of the frame 1 are the channeled bars 5, and as is clearly shown in Figure 8, the open sides of the arms of the U-shaped frame and the respective bars 5 are disposed in opposed relation. These channeled bars 5 are attached to the outer side edges of the automatically movable weir plate 6, that is approximately of the same height as the stationary weir plate 2.

Attached to the upper portion of the respective channeled bars 5, above the movable weir plate 6 are the pontoons or current impact members 7. The top and rear end of each pontoon is open and the bottom of each pontoon slopes upwardly away from the frame and in the direction of upstream, so that the upstream end of each pontoon is of a less depth than the frame end. The angle of the slope of the bottom of each pontoon is in the present instance approximately thirty-four degrees from the horizontal, although it may vary according to the displacement required.

Attached to the inner opposed sides of the pontoon and extending downwardly along the down stream side of the intermediate or automatically movable weir plate 6 are the opposed channeled bars 8, the lower ends of the bars 8, terminating adjacent the lower edge of the weir plate 6, and these channeled bars are rigidly secured to the pontoons and the weir plate 6 for movement therewith.

An inner weir plate 9 is arranged for vertically slidable movement within the opposed channel bars 8 and is manually raised and lowered in the manner to be presently described. The manually adjustable weir plate 9 is adapted to be projected above the upper edge of the intermediate movable weir plate 6 any desirable distance for the purpose of regulating the flow of water from the main channel or canal B to the lateral channel or canal A.

The means for effecting the raising and lowering of the innermost weir plate includes a rack bar 10, that is arranged on the down stream face of the intermediate portion of the weir plate 9 and this vertically disposed rack bar cooperates with a pinion 11 that is keyed or otherwise fixedly secured on a rotatable shaft 12 that extends horizontally across the rear face of the innermost weir plate, the same being rotatable through suitable supporting brackets 13, arranged on the down stream side of the intermediate movable weir plate 6 and secured on one end of the shaft 12 for rotating the same when a wrench or other similar tool is applied is the nut 14.

A locking unit denoted generally by the numeral 15 houses the nut 14 and the adjacent end of the shaft 12, so that access to the nut cannot be had to effect the turning of the shaft 12, whereby to adjust the innermost weir plate 9.

A padlock 16 is associated with the casing of the lock unit, and when the padlock is opened and the hasp 17 and the casing 18 of the lock unit are moved to the position shown in the dotted lines in Figure 6, a wrench may then be applied to the nut 14, to manually rotate the shaft and the pinion 11 arranged thereon so that said pinion will cooperate with the rack bar 10 to raise or lower the weir plate 9 depending upon the direction in which the shaft 12 is rotated.

For the purpose of minimizing friction between the vertically movable weir plates, there is provided a triangular shaped or more specifically the V-shaped bracket 19 that extends rearwardly from the channeled sides or arms of the inverted U-shaped frame 1, the forward ends of the arms of the V-shaped bracket being rigidly secured to the respective arms of the frame 1. A rod 20 that is threaded at its respective ends extends through suitable openings provided therefor in the apex portions of the V-shaped bracket 19, suitable nuts 21 being threaded on the respective ends of the rod for engagement with the inner side of the adjacent brackets as shown very clearly in Figure 9.

An upwardly extending arm 22 is pivotally secured at its lower end on each extremity of the rod 20, a similar arm 23 being pivotally secured at its upper end on each outer end of the rod 20 and a nut 24 is threaded on the outermost end of the rod to retain the pivoted arms in position.

A substantially horizontally disposed lever 25 extends rearwardly from the upper portion of each channeled bar 5 and is pivotally connected thereto, the other end of the lever 25 being pivotally connected to the upper end of the respective arm 22.

A link 26 extends between the intermediate portion of each lever 25 and the forward end portion of the uppermost arm of the adjacent V-shaped bracket 19 as clearly disclosed in Figure 5 of the drawings.

A similar lever 27 affords an operative connection between the lower end of each lever 23 and the adjacent portion of the movable weir plate 6 and a link 28 is interposed between the intermediate portion of each lever 27 and the forward end portion of the lower arm of the adjacent V-shaped bracket 19 as also disclosed very clearly in Figure 5 of the drawings.

The operation of my improved device may be briefly stated as follows:

Normally the movable weir plates are lowered behind the stationary weir plate 2 and the water will flow from the main channel or canal B into the lateral channel or canal A in the space between the pontoons 7. The water striking against the stationary plate 2, creates a pressure directly against the frame 1 and is resisted by the rigidity of its inset in the surrounding box or flume. However, as the head increases, the water rises upwardly in the canal or channel B causing the pontoons to rise upwardly with the increasing head and the upward movement of the pontoons will result in the weir plate 6 being raised. This upward movement, of course, will have a tendency to increase the upstream surface of the dam as it were, and when the pontoons are at the top of the frame, it is a solid upstream surface to halt the flow of water.

For the purpose of regulating the amount of water that flows from the main channel or canal into the lateral channel or canal, the innermost weir plate 9 is manually adjusted and the levers and arms described above will prevent binding action so that the movable weir plates will be free to move upwardly or downwardly as the case may be, thereby assuring a positive operation of the device at all times.

As will be seen from a study of Figure 5, as plate 6 begins to rise above the upper edge of plate 2 and in turn receives the pressure of the water, that pressure is transmitted through the channel members 5 to which plate 6 is attached, and under ordinary conditions, would be resisted by the inner portion of the rear flanges of frame 1. As against the upward lift of the pontoons 7, sufficient friction would be created by this pressure to defeat the purpose of the device. To guard against this friction, the movable portions of the device are hung in place by a system of levers above described, the brackets 19 being rigidly attached to the down stream side of frame 1 provide a support for the whole system of arms, levers and links shown in Figure 5. As also shown, and before described, the arms 25 are attached to the back of the channels 5 in such a manner as to permit them to pivot about their point of attachment. The pressure of the water against the upstream side of plate 6 and against the upstream side of plate 9 when the plates are in the position suggested in Figure 5, is transmitted through channels 5 to the arms 25 whereupon the arms 25 become compression members. The free ends of arms 25 being attached to the free swinging arm 23 offer no resistance to this compression, the links 28 being pivoted to the lowermost arms of the bracket 19 and to the arms 27, these links 28 being of such length and so positioned as to hold the channel 5 free from friction with frame 1, and being tension members absorb the pressure of the water against the plate 6 and at the same time permit a frictionless vertical movement of channel 5 and the rest of the movable parts associated with the channel. It is thought that the movement of the levers, arms and links forming this system for accomplishing the result intended will be clearly apparent from a study of Figure 5.

It will thus be seen from the foregoing description that I have provided an automatic flow control and measuring weir that will at all times insure uniformity of discharge where the level of the water supply is variable and a structure of this character will be strong and durable, yet inexpensive.

While I have shown the preferred embodiment of my invention, it is to be understood that various changes in the size, shape and arrangement of parts may be resorted to, without departing from the spirit of the invention or the scope of the appended claims.

I claim:

1. In a device of the class described, a frame for vertical disposition within a channel and disposed transversely with respect thereto, a stationary weir plate arranged across the bottom portion of the frame, a movable weir plate arranged for vertical slidable movement between the sides of the frame at the down stream side of the stationary weir plate, and pontoons operatively associated with said movable weir plate for effecting the raising and lowering of the same by the action of the water in the canal, an additional movable weir plate mounted for vertical sliding movement on the down stream side of the first mentioned movable weir plate, and means for manually adjusting the last mentioned weir plate with respect to the upper edge of the first mentioned movable weir plate.

2. In a device for controlling the flow of water from one channel into the other, where the communicating channels are at right angles to one another, a frame adapted to be vertically disposed in one of the channels at its point of communication with the other of said channels, a stationary weir plate secured to the frame, and extending transversely in said one channel, a movable weir plate, means for slidably mounting said movable weir plate between the sides of the frame, and a current impact member carried by said movable weir plate and extending transversely of the other of said channels, a second movable weir plate mounted for vertical sliding movement on the down stream side of the first mentioned movable weir plate, means operatively connecting said movable weir plates, said means including means for effecting the manual relative adjustment between said movable weir plates.

3. In a device of the character described, a stationary upright frame, including spaced parallel side members channel shaped in cross section, a stationary weir plate secured to the lower portion of said frame and extending transversely thereof, a movable weir plate having its opposite edges slidable in said side members of the frame, a pair of spaced pontoons extending from the upstream side of said movable weir plate adjacent the upper edge of said movable weir plate, a second movable weir plate, means for slidably mounting said second movable weir plate at the down stream side of the first referred to movable plate, a horizontal shaft, means for rotatably mounting said horizontal shaft on the first mentioned movable weir plate, a pinion on said shaft, and a vertically disposed rack bar carried by the second mentioned movable weir plate with which said pinion cooperates, said shaft being provided at one end with means for securing an actuating member thereto.

In testimony whereof I affix my signature.

JERRY N. NISSEN.